(12) United States Patent
Yang et al.

(10) Patent No.: US 9,227,797 B2
(45) Date of Patent: Jan. 5, 2016

(54) CRANE AND AUTOMATED STORAGE AND RETRIEVAL SYSTEM

(71) Applicant: Shenzhen China Star Optoelectronics Technology Co., Ltd., Shenzhen, Guangdong (CN)

(72) Inventors: Guokun Yang, Shenzhen (CN); Chunhao Wu, Shenzhen (CN); Kunhsien Lin, Shenzhen (CN); Minghu Qi, Shenzhen (CN); Zhenhua Guo, Shenzhen (CN); Yongqiang Wang, Shenzhen (CN); Zenghong Chen, Shenzhen (CN); Chenyangzi Li, Shenzhen (CN); Weibing Yang, Shenzhen (CN); Zhiyou Shu, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 13/699,635

(22) PCT Filed: Oct. 26, 2012

(86) PCT No.: PCT/CN2012/083620
§ 371 (c)(1),
(2) Date: Nov. 22, 2012

(87) PCT Pub. No.: WO2014/063366
PCT Pub. Date: May 1, 2014

(65) Prior Publication Data
US 2014/0112742 A1    Apr. 24, 2014

(30) Foreign Application Priority Data

Oct. 24, 2012    (CN) .......................... 2012 1 0410008

(51) Int. Cl.
*B25J 9/10*    (2006.01)
*B25J 9/04*    (2006.01)
(Continued)

(52) U.S. Cl.
CPC . *B65G 65/00* (2013.01); *B25J 5/02* (2013.01); *B25J 9/042* (2013.01); *B25J 9/044* (2013.01); *B25J 9/107* (2013.01); *B66F 9/07* (2013.01)

(58) Field of Classification Search
CPC ............ B25J 5/02; B25J 9/0084; B25J 9/003; B25J 9/107; B25J 9/042; B25J 9/043; B25J 9/044; B65G 65/00; B65G 65/08; H01L 21/67796; H01L 21/68764; H01L 21/68771; H01L 21/68785
USPC .......................... 414/633, 660; 901/14, 16, 17
See application file for complete search history.

(56) References Cited

U.S. PATENT DOCUMENTS 3,665,148 A * 5/1972 Yasenchak ........... B23K 11/318
                                                    219/124.4
4,507,044 A * 3/1985 Hutchins .................. B25J 9/041
                                                    187/266
(Continued)

FOREIGN PATENT DOCUMENTS

CN    102030284 A    4/2011
CN    102126618 A    7/2011
(Continued)

*Primary Examiner* — Gerald McClain
(74) *Attorney, Agent, or Firm* — Andrew C. Cheng (57) ABSTRACT

A crane includes a first arm, a second arm, a first vertical transmission mechanism and a second vertical transmission mechanism. The first vertical transmission mechanism transmits the first arm and the second arm to move vertically in a synchronous manner, and the second vertical transmission mechanism transmits the second arm to move vertically with respect to the first arm.

18 Claims, 4 Drawing Sheets

(51) Int. Cl.
    *B65G 65/00*   (2006.01)
    *B25J 5/02*   (2006.01)
    *B66F 9/07*   (2006.01)

(56) References Cited

U.S. PATENT DOCUMENTS

| | | | | |
|---|---|---|---|---|
| 4,523,887 A | * | 6/1985 | Reiff | B66C 17/10 |
| | | | | 212/319 |
| 4,566,836 A | * | 1/1986 | Berger | B65G 57/04 |
| | | | | 414/791.6 |
| 4,648,774 A | * | 3/1987 | Dorumsgaard | B23Q 7/04 |
| | | | | 414/416.01 |
| 4,669,943 A | * | 6/1987 | Zamotin | 414/633 |
| 5,456,567 A | * | 10/1995 | Luebke | B66F 9/125 |
| | | | | 187/240 |
| 5,503,516 A | * | 4/1996 | Kasai | B23P 19/001 |
| | | | | 221/134 |
| 5,690,567 A | * | 11/1997 | DeNijs | F16H 19/06 |
| | | | | 198/750.1 |
| 5,818,723 A | * | 10/1998 | Dimitri | G11B 27/002 |
| | | | | 360/99.02 |
| 6,485,285 B1 | * | 11/2002 | Shiotani | B29C 45/42 |
| | | | | 414/225.01 |
| 7,874,544 B2 | * | 1/2011 | Monroe | B66C 5/02 |
| | | | | 254/279 |
| 2003/0221914 A1 | | 12/2003 | Smith et al. | |
| 2012/0061155 A1 | * | 3/2012 | Berger | B25J 5/007 |
| | | | | 180/21 |
| 2013/0341158 A1 | * | 12/2013 | Yang | B65G 47/244 |
| | | | | 198/409 |
| 2014/0076836 A1 | * | 3/2014 | Qi | B66F 9/07 |
| | | | | 212/279 |
| 2014/0123784 A1 | * | 5/2014 | Yang | F16H 19/06 |
| | | | | 74/37 |

FOREIGN PATENT DOCUMENTS

| | | |
|---|---|---|
| CN | 102674014 A | 9/2012 |
| DE | 10109851 A1 | 9/2001 |
| JP | 60151181 A * | 8/1985 |
| JP | 2008074544 A | 4/2008 |

* cited by examiner

CRANE AND AUTOMATED STORAGE AND RETRIEVAL SYSTEM

BACKGROUND OF THE INVENTION

1. Field of the Invention

The present invention relates to the field of mechanical techniques, and in particular to a crane and automated storage and retrieval system (AS/RS).

2. The Related Arts

In AS/RS, the crane is used for moving cassette inside the AS/RS. Specifically, the movement of a crane comprises: moving the cassette from the temporary location of the upstream moving system into AS/RS system, moving the cassette to temporary locations of a plurality of processing machines, moving cassette loaded with processed goods into AS/RS, and moving cassette to the temporary location of the downstream moving system.

Figure 1:
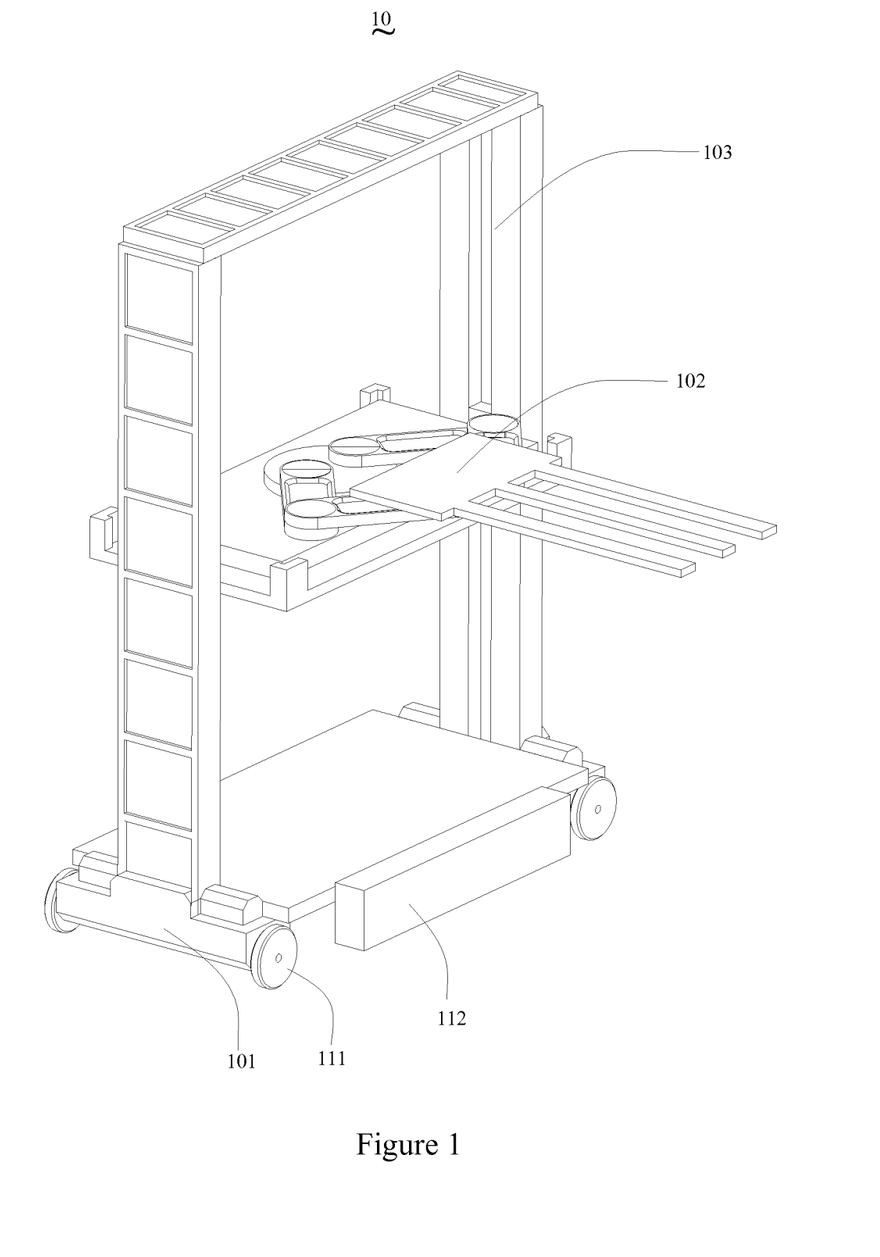
FIG. 1 is a schematic view showing the structure of a known crane.

Referring to FIG. 1, FIG. 1 is a schematic view showing the structure of a known crane. As shown in FIG. 1, a known crane 10 comprises a horizontal transmission mechanism 101, an arm 102 and a vertical transmission mechanism 103, wherein the horizontal transmission mechanism 101 comprises four wheels 111 and a guiding mechanism 112. Under the guidance of guiding mechanism 112, wheels 111 move the arm 102 and the vertical transmission mechanism 103 along the horizontal direction. The vertical transmission mechanism 103 moves the arm 102 along the vertical direction.

Because the crane 10 is only disposed with an arm 102, only one cassette can be moved at one time. When a plurality of cassettes needs to be moved, additional movement process must be executed. Therefore, the efficiency is too low to meet the requirement of the increasing moving demands.

In addition, the horizontal transmission mechanism 101 uses wheels 111 to roll in combination with the guidance of the guiding mechanism 112 to realize the horizontal movement of the arm 102 and the vertical transmission mechanism 103. As the wheel 111 is prone to skidding, the stability of the crane 10 may be compromised.

SUMMARY OF THE INVENTION

The technical issue to be addressed by the present invention is to provide a crane and automated storage and retrieval system (AS/RS), to increase the movement volume of a single turn of movement of the crane to improve movement efficiency as well as production efficiency.

The present invention provides a crane, which comprises: a first arm, a second arm, a first vertical transmission mechanism and a second transmission mechanism; the first vertical transmission mechanism moving the first arm and the second arm to move vertically in a synchronous manner, and the second vertical transmission mechanism moving the second arm vertically with respect to the first arm; wherein the crane further comprising a horizontal transmission mechanism, the horizontal transmission mechanism moving the first arm, the second arm, the first vertical transmission mechanism and the second transmission mechanism horizontally; the crane further comprising a rotation mechanism, the rotation mechanism rotating the first arm, the second arm, the first vertical transmission mechanism and the second transmission mechanism around a vertical axis.

According to a preferred embodiment of the present invention, the first vertical transmission mechanism further moves the second transmission mechanism vertically with the first arm and the second arm synchronously.

The present invention provides a crane, which comprises: a first arm, a second arm, a first vertical transmission mechanism and a second transmission mechanism; the first vertical transmission mechanism moving the first arm and the second arm to move vertically in a synchronous manner, and the second vertical transmission mechanism moving the second arm vertically with respect to the first arm.

According to a preferred embodiment of the present invention, the first vertical transmission mechanism further moves the second transmission mechanism vertically with the first arm and the second arm synchronously.

According to a preferred embodiment of the present invention, the first vertical transmission mechanism comprises two first vertical transmission units disposed with interval, the first arm, the second arm and the second vertical transmission mechanism are disposed between the two vertical transmission units and move vertically and synchronously under the collaboration of the two first vertical transmission units.

According to a preferred embodiment of the present invention, the second vertical transmission mechanism comprises two second vertical transmission units disposed with interval, the two second vertical transmission units move synchronously under the corresponding transmission of the two first vertical transmission units, the second arm is disposed between the two second vertical transmission units, and moves vertically and synchronously under the collaboration of the two second vertical transmission units.

According to a preferred embodiment of the present invention, the first vertical transmission unit and the second vertical transmission unit are screw shaft transmission unit respectively, the screw shaft transmission unit comprises a driver, a damper, a screw shaft, a sliding block and a linear guiding track, wherein the driver drives the screw shaft through damper, the screw shaft moves the sliding block along the linear guiding track so as to move vertically.

According to a preferred embodiment of the present invention, the crane further comprises a horizontal transmission mechanism, and the horizontal transmission mechanism moves the first arm, the second arm, the first vertical transmission mechanism and the second transmission mechanism horizontally.

According to a preferred embodiment of the present invention, the horizontal transmission mechanism comprises two conveyor mechanisms disposed with interval, a sliding block and a linear guiding track: the conveyor mechanism comprises a driver, a damper and a conveyor, the driver drives the conveyor through the damper, and the conveyor moves the sliding block along the linear guiding track so as to move horizontally.

According to a preferred embodiment of the present invention, the crane further comprises a rotation mechanism, and the rotation mechanism rotates the first arm, the second arm, the first vertical transmission mechanism and the second transmission mechanism around a vertical axis.

According to a preferred embodiment of the present invention, the crane further comprises a rotation support wheel, for supporting the first vertical transmission mechanism during the transmission of first vertical transmission mechanism.

The present invention provides an automated storage and retrieval system (AS/RS), the AS/RS comprises a first arm, a second arm, a first vertical transmission mechanism and a second transmission mechanism; the first vertical transmission mechanism moving the first arm and the second arm to move vertically in a synchronous manner, and the second vertical transmission mechanism moving the second arm vertically with respect to the first arm.

According to a preferred embodiment of the present invention, the first vertical transmission mechanism further moves the second transmission mechanism vertically with the first arm and the second arm synchronously.

According to a preferred embodiment of the present invention, the first vertical transmission mechanism comprises two first vertical transmission units disposed with interval, the first arm, the second arm and the second vertical transmission mechanism are disposed between the two vertical transmission units and move vertically and synchronously under the collaboration of the two first vertical transmission units.

According to a preferred embodiment of the present invention, the second vertical transmission mechanism comprises two second vertical transmission units disposed with interval, the two second vertical transmission units move synchronously under the corresponding transmission of the two first vertical transmission units, the second arm is disposed between the two second vertical transmission units, and moves vertically and synchronously under the collaboration of the two second vertical transmission units.

According to a preferred embodiment of the present invention, the first vertical transmission unit and the second vertical transmission unit are screw shaft transmission unit respectively, the screw shaft transmission unit comprises a driver, a damper, a screw shaft, a sliding block and a linear guiding track; wherein the driver drives the screw shaft through damper, the screw shaft moves the sliding block along the linear guiding track so as to move vertically.

According to a preferred embodiment of the present invention, the crane further comprises a horizontal transmission mechanism, and the horizontal transmission mechanism moves the first arm, the second arm, the first vertical transmission mechanism and the second transmission mechanism horizontally.

According to a preferred embodiment of the present invention, the horizontal transmission mechanism comprises two conveyor mechanisms disposed with interval, a sliding block and a linear guiding track; the conveyor mechanism comprises a driver, a damper and a conveyor, the driver drives the conveyor through the damper, and the conveyor moves the sliding block along the linear guiding track so as to move horizontally.

According to a preferred embodiment of the present invention, the crane further comprises a rotation mechanism, and the rotation mechanism rotates the first arm, the second arm, the first vertical transmission mechanism and the second transmission mechanism around a vertical axis.

According to a preferred embodiment of the present invention, the crane further comprises a rotation support wheel, for supporting the first vertical transmission mechanism during the transmission of first vertical transmission mechanism.

The efficacy of the present invention is that to be distinguished from the state of the art. Through using the first vertical transmission mechanism moving the first arm and the second arm to move vertically in a synchronous manner, and the second vertical transmission mechanism moving the second arm vertically with respect to the first arm, the crane of the present invention can move two cassettes with the first arm and the second arm at a time to increase the volume moved in a single turn so as to improve the movement efficiency and the production efficiency.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following refers drawings and embodiment to describe the present invention in details.

Figure 2:
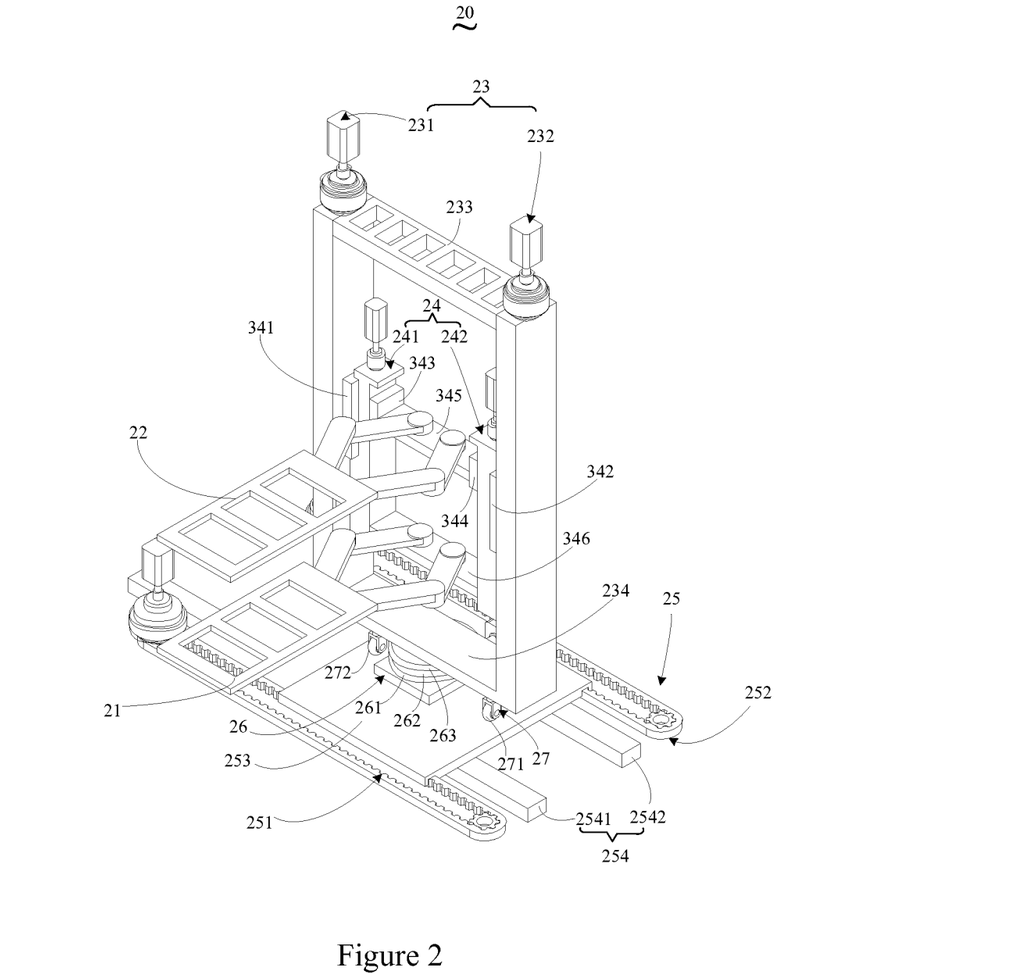
FIG. 2 is a schematic view showing the structure of a crane of the first embodiment according to the present invention.

Referring to FIG. 2, FIG. 2 is a schematic view showing the structure of a crane of the first embodiment according to the present invention. As shown in FIG. 2, a crane 20 of the present embodiment comprises: a first arm 21, a second arm 22, a first vertical transmission mechanism 23 and a second transmission mechanism 24; wherein the first vertical transmission mechanism 23 transmits the first arm 21 and the second arm 22 to move vertically in a synchronous manner, and the second vertical transmission mechanism 24 transmits the second arm 22 vertically with respect to the first arm 21.

In the instant embodiment, the first vertical transmission mechanism 23 further transmits the second transmission mechanism 24 vertically with the first arm 21 and the second arm 22 synchronously.

Specifically, the first vertical transmission mechanism 23 comprises two first vertical transmission units 231, 232 disposed with interval. The two ends of the two first vertical transmission units 231, 232 are disposed with an upper beam 233 and lower beam 234 respectively so that the two first vertical transmission units 231, 232, the upper beam 233 and the lower beam 234 form a rectangular structure. The first arm 21, the second arm 22 and the second vertical transmission mechanism 24 are disposed between the two vertical transmission units 231, 232 and move vertically and synchronously under the collaboration of the two first vertical transmission units 231, 232. Furthermore, the second vertical transmission mechanism 24 comprises two second vertical transmission units 241, 242 disposed with interval. The two second vertical transmission units 241, 242 move synchronously under the corresponding transmission of the two first vertical transmission units 231, 232. In the instant embodiment, the second vertical transmission unit 241 moves preferably under the corresponding transmission of the first vertical transmission unit 231, and the second vertical transmission unit 242 moves preferably under the corresponding transmission of the first vertical transmission unit 232. In addition, the second arm 22 is disposed between the two second vertical transmission units 241, 242, and moves vertically and synchronously under the collaboration of the two second vertical transmission units 241, 242.

Figure 3:
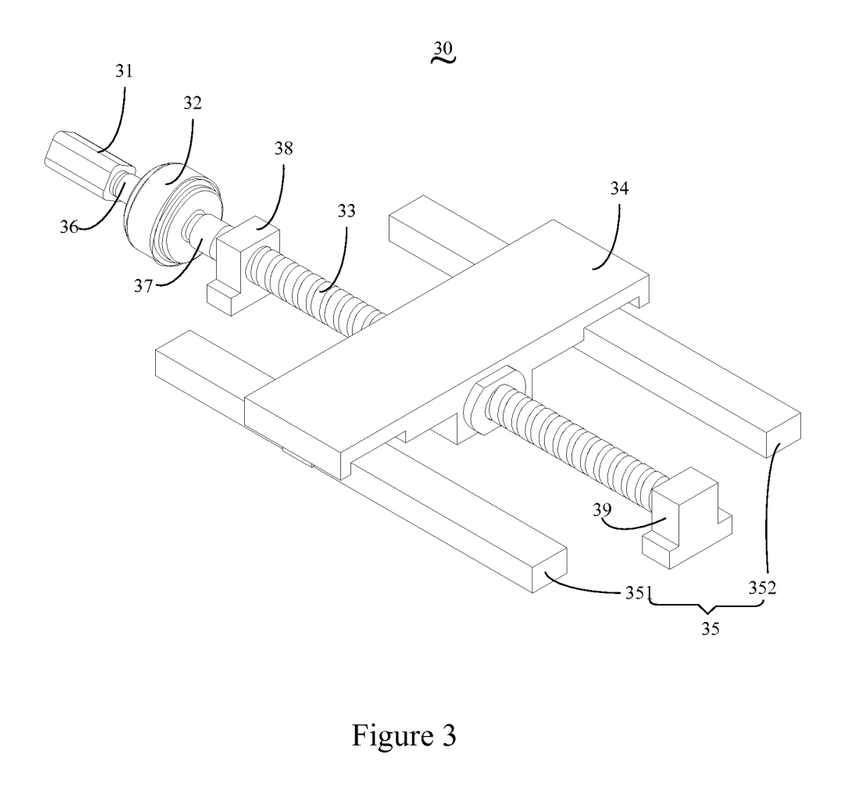
FIG. 3 is a schematic view showing the structure of the screw shaft transmission unit of the crane in FIG. 2.

In the instant embodiment, the first vertical transmission units 231, 232 and the second vertical transmission units 241, 242 are screw shaft transmission unit respectively. Referring to FIG. 3, FIG. 3 is a schematic view showing the structure of the screw shaft transmission unit of the crane according to the present invention. As shown in FIG. 3, the screw shaft transmission unit 30 comprises a driver 31, a damper 32, a screw shaft 33, a sliding block 34 and a linear guiding track 35. The linear guiding track 35 comprises a first linear guiding track 351 and a second linear guiding track 352, disposed with interval on two sides of screw shaft 33. The driver 31 drives the screw shaft 33, and the screw shaft 33 transmits the sliding block 34 along the first linear guiding track 351 and the second linear guiding track 352 so that the sliding block 34 moves vertically. Furthermore, the screw shaft transmission unit 30 of the present invention further comprises two couplings 36, 37 and two bearing bases 38, 39. The coupling 36 is linked to the driver 31 and the damper 32. The coupling 37 is linked to the damper 32 and the screw shaft 33. The two bearing bases 38, 39 are disposed at two ends of the screw shaft 33 for supporting the screw shaft 33.

Referring to FIG. 2 again, the second vertical transmission unit 241 is disposed on the sliding block 341 of the first vertical transmission unit 231, and the second vertical transmission unit 242 is disposed on the sliding block 342 of the first vertical transmission unit 232. A beam 345 is disposed between the sliding block 343 of the second transmission unit 241 and the sliding block 344 of the second transmission unit 242, and the second arm 22 is installed to the beam 345. The present invention further disposes a beam 346 between the two second vertical transmission units 241, 242, and the first arm 21 is installed to the beam 346. In the instant embodiment, the beam 346 is preferably disposed below the beam 345. In other embodiments, the beam 346 can also be disposed above the beam 345.

When the sliding block 341 and the sliding block 342 move vertically and synchronously, the second vertical transmission units 241, 242 will move vertically with the sliding block 341 and the sliding block 342 synchronously so that the first arm 21 and the second arm 22 also move vertically and synchronously. When the sliding block 343 and the sliding block 344 move vertically and synchronously, the second arm 22 also moves vertically and synchronously with the sliding block 343 and the sliding block 344 so that the second arm 22 moves vertically with respect to the first arm 21.

Therefore, when the crane 20 of the present invention moves cassette, the first arm 21 and the second arm 22 can be used simultaneously. In other words, two cassettes can be moved at a time, or the second arm 22 moves vertically with respect to the first arm 21 to fix the cassette between the first arm 21 and the second arm 22 to accomplish retrieving or storing cassette.

It should be noted that the first arm 21 and the second arm 22 can also move horizontally. Referring to FIG. 2 again, the crane 20 further comprises a horizontal transmission mechanism 25. The horizontal transmission mechanism 25 transmits the first arm 21, the second 22 arm the first vertical transmission mechanism 23 and the second transmission mechanism 24 horizontally.

Figure 4:
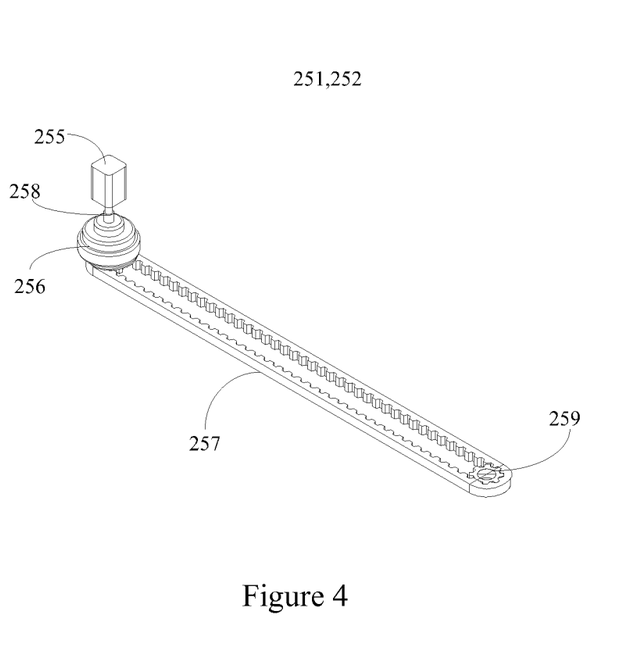
FIG. 4 is a schematic view showing the structure of the conveyor mechanism of the crane in FIG. 2.

Specifically, the horizontal transmission mechanism 25 comprises two conveyor mechanisms 251, 252 disposed with interval, a sliding block 253 and a linear guiding track 254, wherein the linear guiding track 254 further comprises a third linear guiding track 2541 and a fourth linear guiding track 2542, disposed with interval between the two conveyor mechanisms 251, 252. The sliding block 253 is fixed to the two conveyor mechanisms 251, 252. Also referring to FIG. 4, FIG. 4 is a schematic view showing the structure of the conveyor mechanisms 251, 252. As shown in FIG. 4, each of the conveyor mechanisms 251, 252 comprises a driver 255, a damper 256 and a conveyor 257, wherein the driver 255 drives the conveyor 257 through the damper 256, and the conveyor 257 transmits the sliding block 253 along the I third linear guiding track 2541 and the fourth linear guiding track 2542 so that the first arm 21, the second arm 22, the first vertical transmission mechanism 23 and the second vertical transmission mechanism 24 move horizontally with the sliding block 253.

Furthermore, the conveyor mechanisms 251, 252 further comprise coupling 258 and conveyor wheel 259, wherein coupling 258 is linked to the driver 255 and the damper 256, the damper 256 satisfies the transmission speed of conveyor 257 by lowering rotation speed outputted by the driver 255 and increasing the torque. The number of conveyor wheels 259 is preferably two, and the two conveyor wheels are disposed at two ends of the conveyor 257.

In the instant embodiment, the crane further comprises a rotation mechanism 26 and a rotation support wheel 27. The rotation mechanism rotates 26 the first arm 21, the second arm 22, the first vertical transmission mechanism 23 and the second transmission mechanism 24 around a vertical axis. The rotation support wheel 27 is for supporting the first vertical transmission mechanism 23 during the transmission of first vertical transmission mechanism 23 to lessen the gravity of the first vertical transmission mechanism 23 on the rotation mechanism 26. Specifically, the rotation support wheel 27 comprises a first rotation support wheel 272 and a second rotation support wheel 272. The first rotation support wheel 271 and the second rotation support wheel 272 are disposed respectively on two sides of rotation mechanism 26. The rotation mechanism 26 comprises a driver 261, a coupling 262 and a damper 263. The driver 261 is linked to damper 263 through the coupling 262, and the damper 263 uses a required speed to transmit the first arm 21, the second arm 22, the first vertical transmission mechanism 23 and the second transmission mechanism 24 around a vertical axis by lowering the rotation speed outputted by the driver 261 and increasing torque.

The present invention further provides an automated storage and retrieval system (AS/RS), which comprises the aforementioned crane 20.

In summary, through using the first vertical transmission mechanism moving the first arm and the second arm to move vertically in a synchronous manner, and the second vertical transmission mechanism moving the second arm vertically with respect to the first arm, the crane of the present invention can move two cassettes with the first arm and the second arm at a time to increase the volume moved in a single turn so as to improve the movement efficiency and the production efficiency.

In addition, the present invention also dispose two conveyor mechanism disposed with interval to transmit the first arm, the second arm, the first vertical transmission mechanism and the second vertical transmission mechanism to move horizontally to avoid the skidding and maintain the stability of the crane during operation.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A crane, which comprises: a first arm, a second arm, a first vertical transmission mechanism and a second transmission mechanism; the first vertical transmission mechanism moving the first arm and the second arm to move vertically in a synchronous manner, and the second vertical transmission mechanism moving the second arm vertically with respect to the first arm;

wherein the crane further comprising a horizontal transmission mechanism, the horizontal transmission mechanism moving the first arm, the second arm, the first vertical transmission mechanism and the second transmission mechanism horizontally;
the crane further comprising a rotation mechanism, the rotation mechanism rotating the first arm, the second arm, the first vertical transmission mechanism and the second transmission mechanism around a vertical axis;
the rotation mechanism comprises a driver, a coupling and a damper the driver is linked to damper through the coupling, and the damper uses a required speed to transmit the first arm, the second arm, the first vertical transmission mechanism and the second transmission mechanism around a vertical axis by lowering the rotation speed outputted by the driver and increasing torque;
wherein the vertical axis and a center axis of the rotation mechanism are co-linear.

2. The crane as claimed in claim 1, characterized in that the first vertical transmission mechanism further moves the second transmission mechanism vertically with the first arm and the second arm synchronously.

3. A crane, which comprises: a first arm, a second arm, a first vertical transmission mechanism and a second transmission mechanism; the first vertical transmission mechanism moving the first arm and the second arm to move vertically in a synchronous manner, and the second vertical transmission mechanism moving the second arm vertically with respect to the first arm;
the crane further comprising a rotation mechanism, the rotation mechanism rotating the first arm, the second arm, the first vertical transmission mechanism and the second transmission mechanism around a vertical axis;
the rotation mechanism comprises a driver, a coupling and a damper, the driver is linked to damper through the coupling, and the damper uses a required speed to transmit the first arm, the second arm, the first vertical transmission mechanism and the second transmission mechanism around a vertical axis by lowering the rotation speed outputted by the driver and increasing torque;
wherein the vertical axis and a center axis of the rotation mechanism are co-linear.

4. The crane as claimed in claim 3, characterized in that the first vertical transmission mechanism further moves the second transmission mechanism vertically with the first arm and the second arm synchronously.

5. The crane as claimed in claim 4, characterized in that the first vertical transmission mechanism comprises two first vertical transmission units disposed with interval, the first arm, the second arm and the second vertical transmission mechanism are disposed between the two vertical transmission units and move vertically and synchronously under the collaboration of the two first vertical transmission units.

6. The crane as claimed in claim 5, characterized in that the second vertical transmission mechanism comprises two second vertical transmission units disposed with interval, the two second vertical transmission units move synchronously under the corresponding transmission of the two first vertical transmission units, the second arm is disposed between the two second vertical transmission units, and moves vertically and synchronously under the collaboration of the two second vertical transmission units.

7. The crane as claimed in claim 6, characterized in that the first vertical transmission unit and the second vertical transmission unit are screw shaft transmission unit respectively, the screw shaft transmission unit comprises a driver, a damper, a screw shaft, a sliding block and a linear guiding track; wherein the driver drives the screw shaft through damper, the screw shaft moves the sliding block along the linear guiding track so as to move vertically.

8. The crane as claimed in claim 3, characterized in that the crane further comprises a horizontal transmission mechanism, and the horizontal transmission mechanism moves the first arm, the second arm, the first vertical transmission mechanism and the second transmission mechanism horizontally.

9. The crane as claimed in claim 8, characterized in that the horizontal transmission mechanism comprises two conveyor mechanisms disposed with interval, a sliding block and a linear guiding track; the conveyor mechanism comprises a driver, a damper and a conveyor, the driver drives the conveyor through the damper, and the conveyor moves the sliding block along the linear guiding track so as to move horizontally.

10. The crane as claimed in claim 3, characterized in that the crane further comprises a rotation support wheel, for supporting the first vertical transmission mechanism during the transmission of first vertical transmission mechanism.

11. An automated storage and retrieval system (AS/RS), the AS/RS comprises a first arm, a second arm, a first vertical transmission mechanism and a second transmission mechanism; the first vertical transmission mechanism moving the first arm and the second arm to move vertically in a synchronous manner, and the second vertical transmission mechanism moving the second arm vertically with respect to the first arm;
the crane further comprising a rotation mechanism, the rotation mechanism rotating the first arm, the second arm, the first vertical transmission mechanism and the second transmission mechanism around a vertical axis;
the rotation mechanism comprises a driver, a coupling and a damper, the driver is linked to damper through the coupling, and the damper uses a required speed to transmit the first arm, the second arm, the first vertical transmission mechanism and the second transmission mechanism around a vertical axis by lowering the B rotation speed outputted by the driver and increasing torque;
wherein the vertical axis and a center axis of the rotation mechanism are co-linear.

12. The automated storage and retrieval system (AS/RS) as claimed in claim 11, characterized in that the crane further comprises a rotation support wheel, for supporting the first vertical transmission mechanism during the transmission of first vertical transmission mechanism.

13. The automated storage and retrieval system (AS/RS) as claimed in claim 11, characterized in that the first vertical transmission mechanism further moves the second transmission mechanism vertically with the first arm and the second arm synchronously.

14. The automated storage and retrieval system (AS/RS) as claimed in claim 13, characterized in that the first vertical transmission mechanism comprises two first vertical transmission units disposed with interval, the first arm, the second arm and the second vertical transmission mechanism are disposed between the two vertical transmission units and move vertically and synchronously under the collaboration of the two first vertical transmission units.

15. The automated storage and retrieval system (AS/RS) as claimed in claim 14, characterized in that the second vertical transmission mechanism comprises two second vertical transmission units disposed with interval, the two second vertical transmission units move synchronously under the corresponding transmission of the two first vertical transmission units, the second arm is disposed between the two second vertical transmission units, and moves vertically and synchronously under the collaboration of the two second vertical transmission units.

16. The automated storage and retrieval system (AS/RS) as claimed in claim 15, characterized in that the first vertical transmission unit and the second vertical transmission unit are screw shaft transmission unit respectively, the screw shaft transmission unit comprises a driver, a damper, a screw shaft, a sliding block and a linear guiding track; wherein the driver drives the screw shaft through damper, the screw shaft moves the sliding block along the linear guiding track so as to move vertically.

17. The automated storage and retrieval system (AS/RS) as claimed in claim 11, characterized in that the crane further comprises a horizontal transmission mechanism, and the horizontal transmission mechanism moves the first arm, the second arm, the first vertical transmission mechanism and the second transmission mechanism horizontally.

18. The automated storage and retrieval system (AS/RS) as claimed in claim 17, characterized in that the horizontal transmission mechanism comprises two conveyor mechanisms disposed with interval, a sliding block and a linear guiding track; the conveyor mechanism comprises a driver, a damper and a conveyor, the driver drives the conveyor through the damper, and the conveyor moves the sliding block along the linear guiding track so as to move horizontally.

* * * * *